United States Patent
Harter et al.

(10) Patent No.: US 6,633,090 B2
(45) Date of Patent: Oct. 14, 2003

(54) STARTING SYSTEM FOR AN AUTOMOTIVE VEHICLE USING FINGERPRINT RECOGNITION

(75) Inventors: Joseph E. Harter, Kokomo, IN (US); Gregory K. Scharenbroch, Kokomo, IN (US); Gerald J. Witt, Carmel, IN (US); David E. Schnelker, Agoura Hills, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/949,462

(22) Filed: Sep. 7, 2001

(65) Prior Publication Data

US 2003/0048000 A1 Mar. 13, 2003

(51) Int. Cl.[7] .............................................. B60R 22/00
(52) U.S. Cl. ....................... 307/10.6; 307/10.3; 340/5.2; 340/5.53
(58) Field of Search ................................ 307/10.3, 10.6; 340/430, 426, 438, 5.2, 5.53; 200/315; 382/115, 116, 126

(56) References Cited

U.S. PATENT DOCUMENTS

| | | | | |
|---|---|---|---|---|
| 3,641,489 A | * | 2/1972 | Shimomura | 340/457 |
| 4,501,012 A | * | 2/1985 | Kishi et al. | 704/275 |
| 4,856,072 A | * | 8/1989 | Schneider et al. | 180/289 |
| 5,126,885 A | * | 6/1992 | Gray | 359/841 |
| 5,867,802 A | * | 2/1999 | Borza | 307/10.2 |
| 5,879,454 A | * | 3/1999 | Peng | 118/31.5 |
| 6,078,265 A | * | 6/2000 | Bonder et al. | 340/5.23 |
| 6,100,811 A | * | 8/2000 | Hsu et al. | 340/430 |
| 6,140,939 A | * | 10/2000 | Flick | 340/426 |
| 6,271,745 B1 | * | 8/2001 | Anzai et al. | 340/5.23 |
| 6,373,148 B1 | * | 4/2002 | Daiss et al. | 307/10.1 |
| 6,382,416 B1 | * | 5/2002 | Gainey | 206/317 |

* cited by examiner

Primary Examiner—Brian Sircus
Assistant Examiner—Sharon A. Polk
(74) Attorney, Agent, or Firm—Jimmy L. Funke; Stefan V. Chmielewski

(57) ABSTRACT

A starting system for an engine of an automotive vehicle having an ignition system includes a fingerprint sensor (26) that generates a fingerprint signal. A memory has a plurality of authorized fingerprint signals stored therein. A switch (28) is used to generate a start signal. A controller is coupled to the ignition system (20), the fingerprint sensor (26), the memory (18), and switch (28). The controller compares the fingerprint signal with the authorized fingerprint signal stored in the memory and enables the ignition system in response to the start signal and the fingerprint signal being substantially equal to an authorized fingerprint signal.

16 Claims, 4 Drawing Sheets

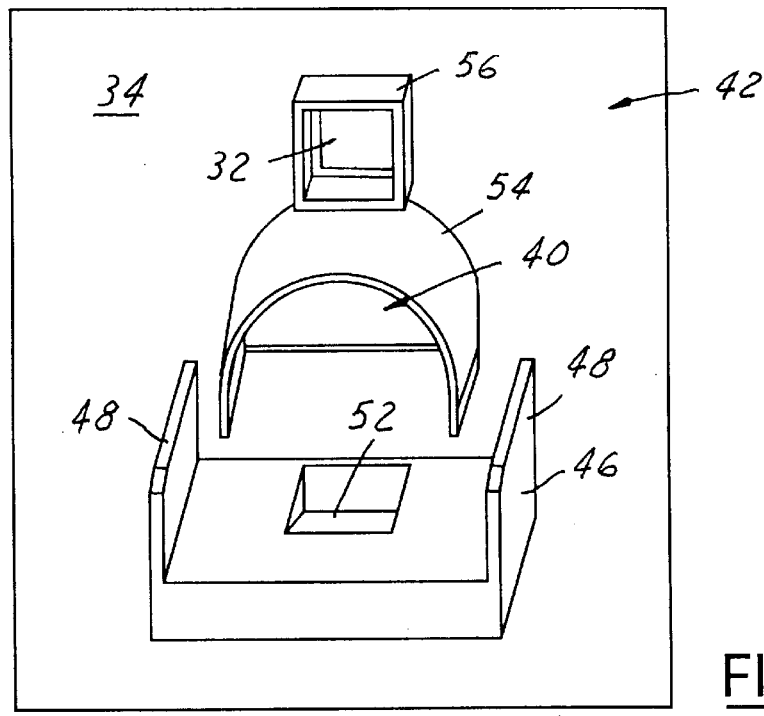
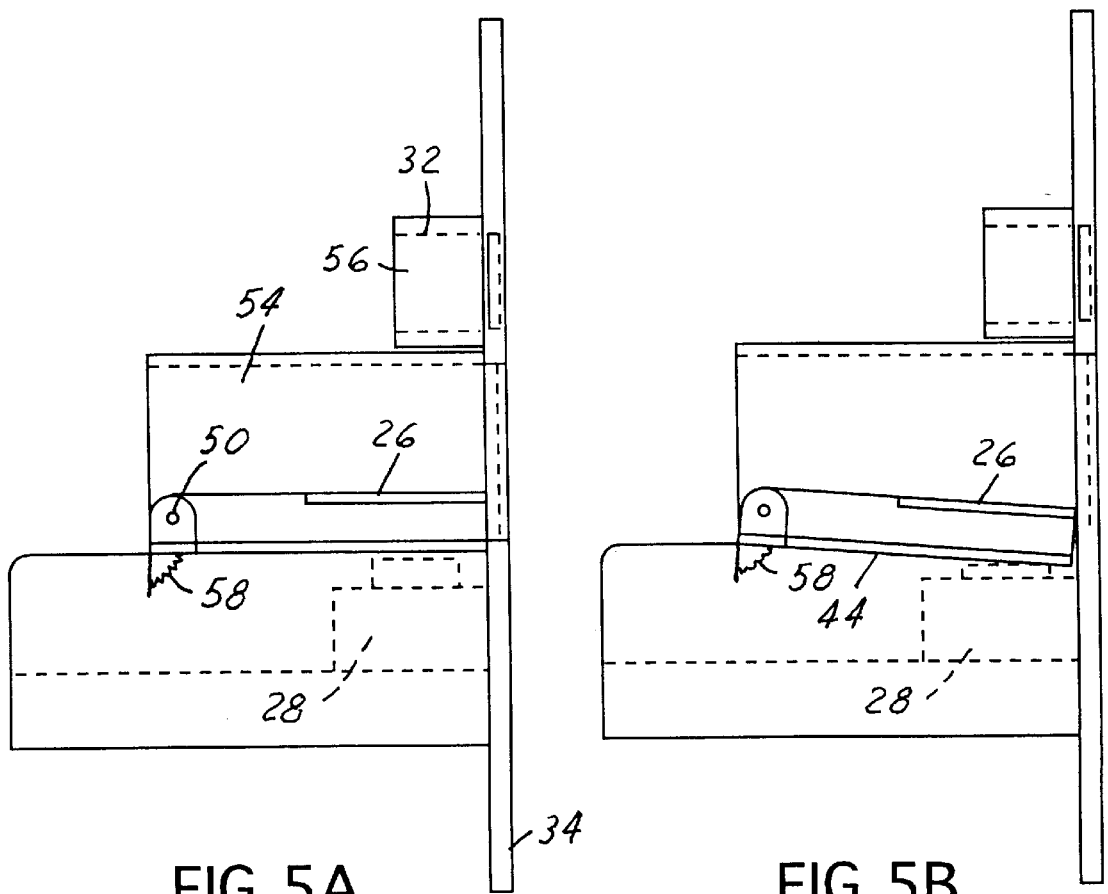
FIG. 4
FIG. 5A    FIG. 5B

STARTING SYSTEM FOR AN AUTOMOTIVE VEHICLE USING FINGERPRINT RECOGNITION

TECHNICAL FIELD

The present invention relates generally to a starting system for an automotive vehicle, and more particularly to a starting system for the automotive vehicle.

BACKGROUND OF THE INVENTION

Ignition systems for automotive vehicles are used to crank the engine. Typically, a starter motor engages the crankshaft while the spark and fuel injection systems provide fuel and spark ignition to each cylinder. To initiate the operation of the starter motor, a key is placed within an ignition switch and rotated to the run position.

Keys are cumbersome and may be subject to loss. Thus, when the keys are lost, the driver cannot operate the vehicle.

Ignition switches may be tampered with to allow theft of the vehicle. Various types of security systems are employed in addition to a key to prevent vehicle theft. Such devices include transponders or other electrical circuits that provide a code to allow the vehicle to start. Such circuitry is typically provided mounted on the key and when the key is lost, the vehicle cannot be started.

Fingerprint recognition technology is maturing to the point where it has begun to be incorporated into security and consumer personal computer applications. Such systems are believed to be reliable in various types of operating conditions and therefore may find use in many other types of applications.

It would therefore be desirable to provide a vehicle with fingerprint recognition technology to replace keys and security circuits or transponders associated therewith into a starting system for an automotive vehicle.

SUMMARY OF THE INVENTION

It is therefore one object of the invention to replace a key actuated starting system with fingerprint recognition technology.

In one aspect of the invention, a starting system for an engine of an automotive vehicle having an ignition system includes a fingerprint sensor generating a fingerprint signal. A memory has an authorized fingerprint signal stored therein. A switch generates a start signal and a controller is coupled to the ignition system, the fingerprint sensor, the memory, and the switch. The controller compares the first fingerprint signal with the authorized fingerprint signal and enables the ignition system in response to the start signal and the first fingerprint signal being substantially equal to the authorized fingerprint signal.

In another aspect of the invention, a switch for an automotive vehicle includes a pivoting member having a first position and a second position. A spring urges the pivoting member into the first position. A fingerprint sensor is disposed on the pivoting member. A first housing is disposed adjacent to the pivoting member. A switch is disposed on the housing so that when the switch is in the second position the switch is closed. The switch is preferably located in a convenient location such as within the instrument panel of the automotive vehicle.

In yet another aspect of the invention a method of starting an automotive vehicle comprises:

generating a first fingerprint signal from a fingerprint sensor;

comparing said first fingerprint with a second fingerprint signal stored within a memory;

issuing a fingerprint enable signal in response to said fingerprint being within said memory;

generating a start signal; and starting an engine in response to said start signal response and said fingerprint enable signal.

One advantage of the invention is that the fingerprint recognition system can act as the security system and the "key" to enable operation of the ignition system. Advantageously, the system relies on the fingerprint of the operator, which is not subject to loss.

Another advantage of the invention is that guest users may be programmed into the system to enable them to operate the vehicle.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 4 is a rear view of a switch according to the present invention.

FIG. 5A is a side view of a switch in a rest position according to the present invention.

FIG. 5B is a side view of a switch in a depressed position according to the present invention.

DESCRIPTION OF THE PREFERRED EMBODIMENT

Figure 1:
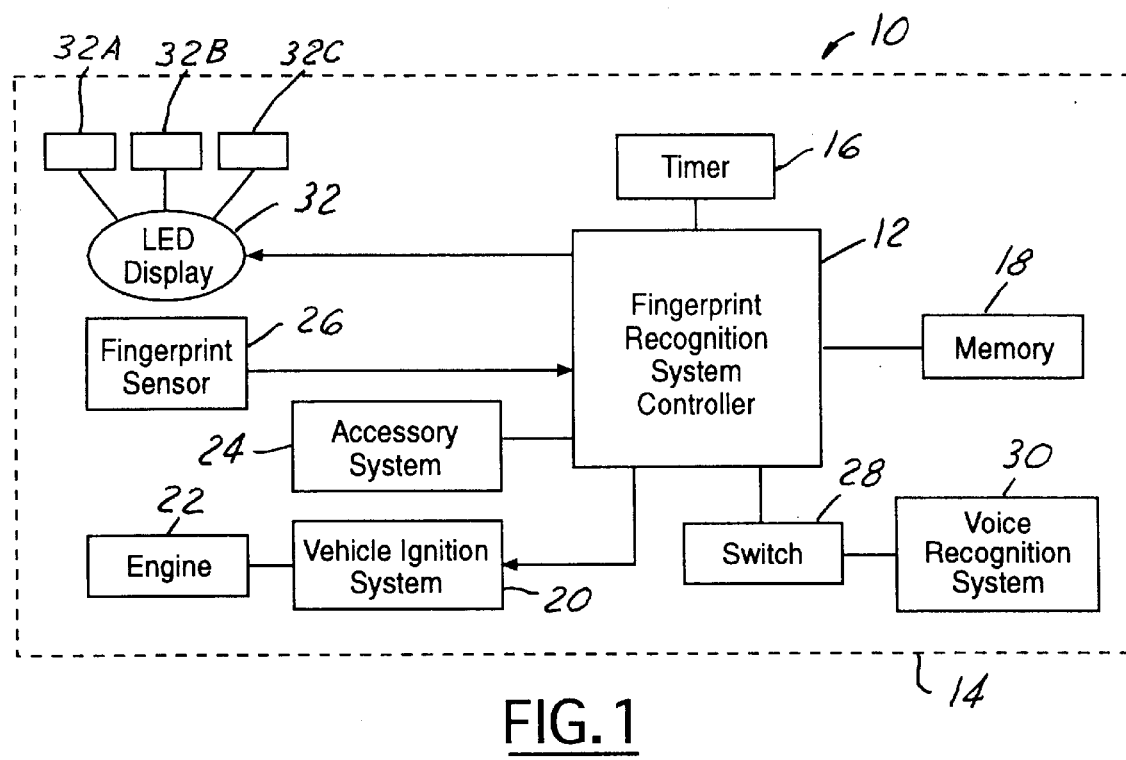
FIG. 1 is a block diagrammatic schematic view of the starting system according to the present invention.
Figure 3:
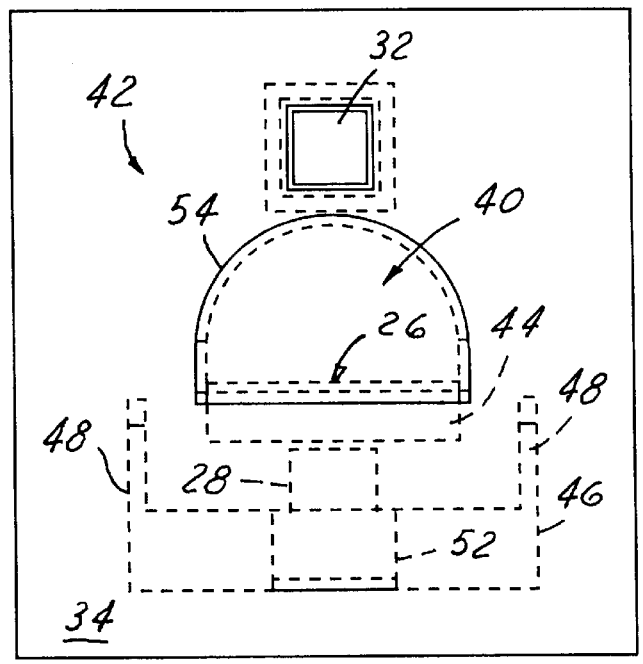
FIG. 3 is a front view of a switch according to the present invention.

In the following figures, the same reference numerals will be used to identify the same components. While the switch configuration is shown for an automotive ignition application, the switch may be used in a number of fingerprint recognition applications.

Referring now to FIG. 1, a starting system 10 according to the present invention is illustrated in functional block diagrammatic form. System 10 has a fingerprint recognition system controller 12 that controls the operation of the system. Controller 12 is preferably microprocessor-based and is coupled directly or through a bus to various components of the automotive vehicle 14. Controller 12 is coupled to a timer 16 and a memory 18. Both timer 16 and memory 18 are illustrated as separate components. However, those skilled in the art will recognize that controller 12 may have a timer 16 and memory 18 as an integral part thereof. Timer 16 is capable of timing the time between various operations performed by system 10. Memory 18 is used to store various information such as authorized fingerprint signals to be used in a comparison as will be further described below.

Controller 12 is coupled to a vehicle ignition system 20. Vehicle ignition system 20 may comprise various components including a starter motor and an engine controller used to control the spark and fuel delivery to engine 22.

Accessory system 24 includes various electrical components within the automotive vehicle that are not operated by ignition system 20. Accessory system 24 may for example, include the radio, electrical window motors, and the like. As will be further described below, accessory system 24 may be enabled by fingerprint recognition system controller 12 without enabling vehicle ignition system 20.

A fingerprint sensor 26 is coupled to controller 12. Fingerprint sensor 26 generates fingerprint signals that are communicated to controller 12. Fingerprint sensor 26 may comprise various types of fingerprint sensors. Fingerprint sensors typically have a light source, an optical image device that converts the optical image into a digital signal (or signature) for comparison with authorized signals stored in the memory. Other suitable types of fingerprint sensors include but are not limited to feedback capacitive type, thermal (pyro-electrical), and ultrasound. The present application is not specific to any type of fingerprint sensor technology.

A switch 28 may also be coupled to controller 12. Switch 28 is preferably a non-key-activated switch that initiates the starting of engine 22 after an authorized fingerprint signal has been received from fingerprint sensor 26.

Switch 28 may comprise various types of switches including a mechanical switch that closes two contacts to activate the vehicle ignition system or accessory system 24. Switch 28 may also be a voice-activated switch as part of a voice recognition system 30. For example, voice recognition system 30 may recognize an "engine on" command and operate switch 28 to generate an enable signal for controller 12 to initiate the operation of vehicle ignition system 20 to the start engine 22. Thus, the voice-activated switch may therefore, be all or partially implemented in software.

An indicator 32 is also coupled to system controller 12. Indicator 32 as used in the present invention is an LED display comprising three different color LEDs. The colors used in this embodiment are red 32A, yellow 32B, and green 32C. However, indicator 32 may also comprise other types of indication means including various types of lamps or an audible indication means such as tones or through the speaker system of the audio system or other types of buzzers or tone generators.

Figure 2:
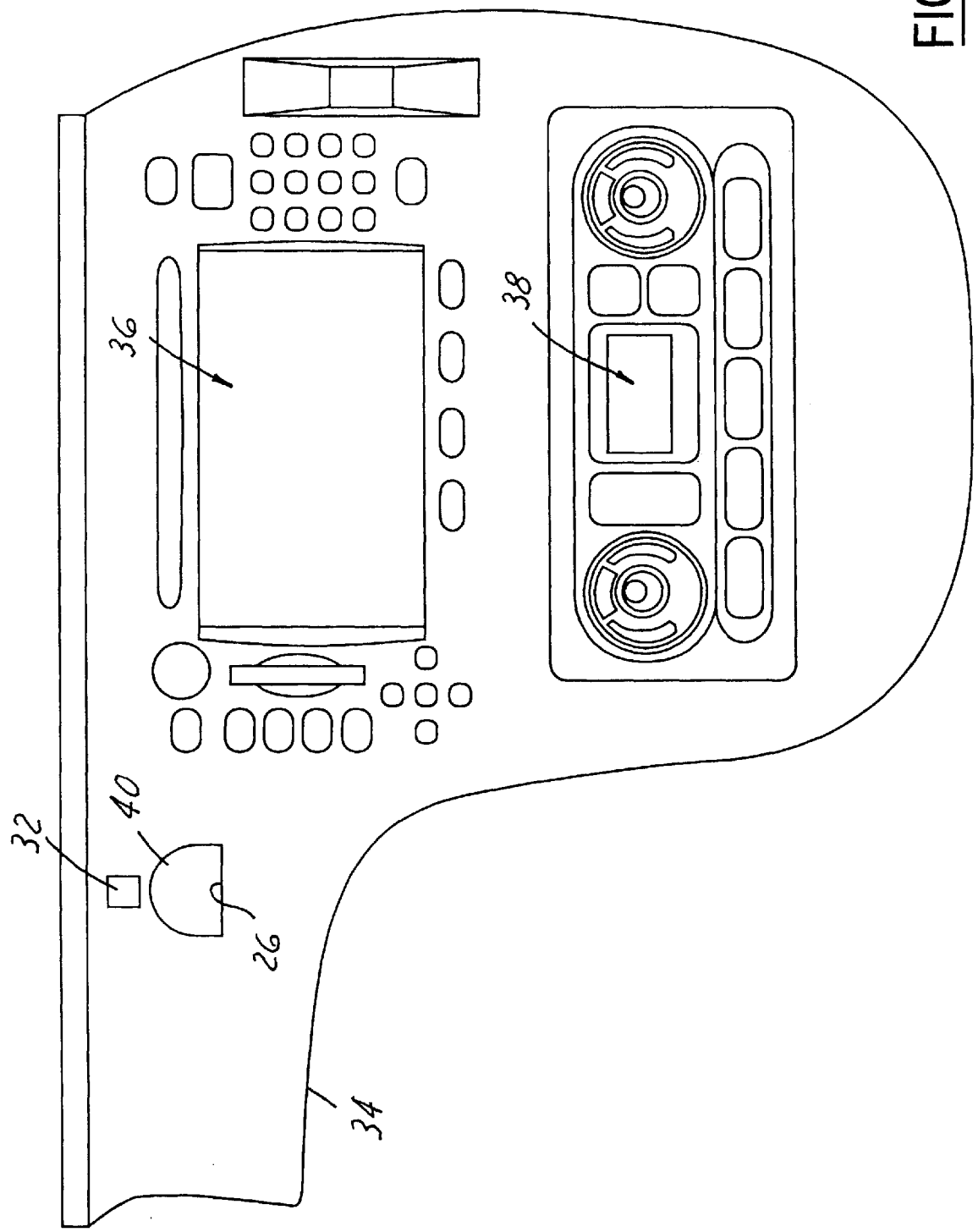
FIG. 2 is an elevational view of a portion of an instrument panel having a switch according to the present invention.

Referring now to FIG. 2, a portion of an instrument panel 34 is illustrated. Instrument panel 34 may be used to house various types of accessories including a navigation system 36 and a radio 38. In addition, instrument panel 34 may have a receptacle 40 containing fingerprint sensor 26. Indicator 32 may also be positioned within instrument panel 34.

Referring now to FIGS. 3, 4, 5A, and 5B, switch assembly 42 is illustrated in further detail. Switch assembly 42 as mentioned above is illustrated within instrument panel 34. However, various other locations within the automotive vehicle may be suitable. Switch assembly 42 includes a pivoting member 44 that has fingerprint sensor 26 positioned thereon. Receptacle 40 may also include a wall 54 therearound for defining the opening into which a finger may be inserted. As illustrated, wall 54 forms an arch. However, other shapes may be used. Pivoting member 44 is pivotably mounted to a wall 54.

A housing 46 has extensions 48 extending upward as illustrated. Extensions 48 are used to prevent an inserted finger from moving beyond the desired area within switch. Those skilled in the art will recognize that pivoting member may also be pivotally mounted to extensions 48. Housing 46 may also be used to position switch 28 relative to pivot member 44. Switch 28 may be located on housing 46 or may be located within a switch receptacle 52.

An indicator wall 56 may also be formed within instrument panel 34. Indicator wall 56 may be used to secure LED indicator 32 therein. As is best shown by contrasting FIGS. 5A and 5B, pivoting member 44 has a first position as illustrated in FIG. 5A and a second position illustrated in FIG. 5B. In FIG. 5A the switch is at rest. In FIG. 5B, the switch 28 is activated and sends an enable signal to the controller 12 illustrated in FIG. 1. By activating switch 28 the operator of the vehicle is indicating the desirability of operating the accessory system or the ignition system of the vehicle. As will be further described below, switch 28 cannot be activated unless an authorized operator is recognized by fingerprint sensor 26 and controller 12.

A spring member 58 is used to bias pivoting member 44 to the at rest position which is horizontal position in this example. Thus, after the pivoting member 44 is rotated about pivot point 50, spring 58 returns pivoting member 44 to the horizontal position after the depression force from the finger has been removed. Various types and positions of springs would be evident to those skilled in the art.

Figure 6:
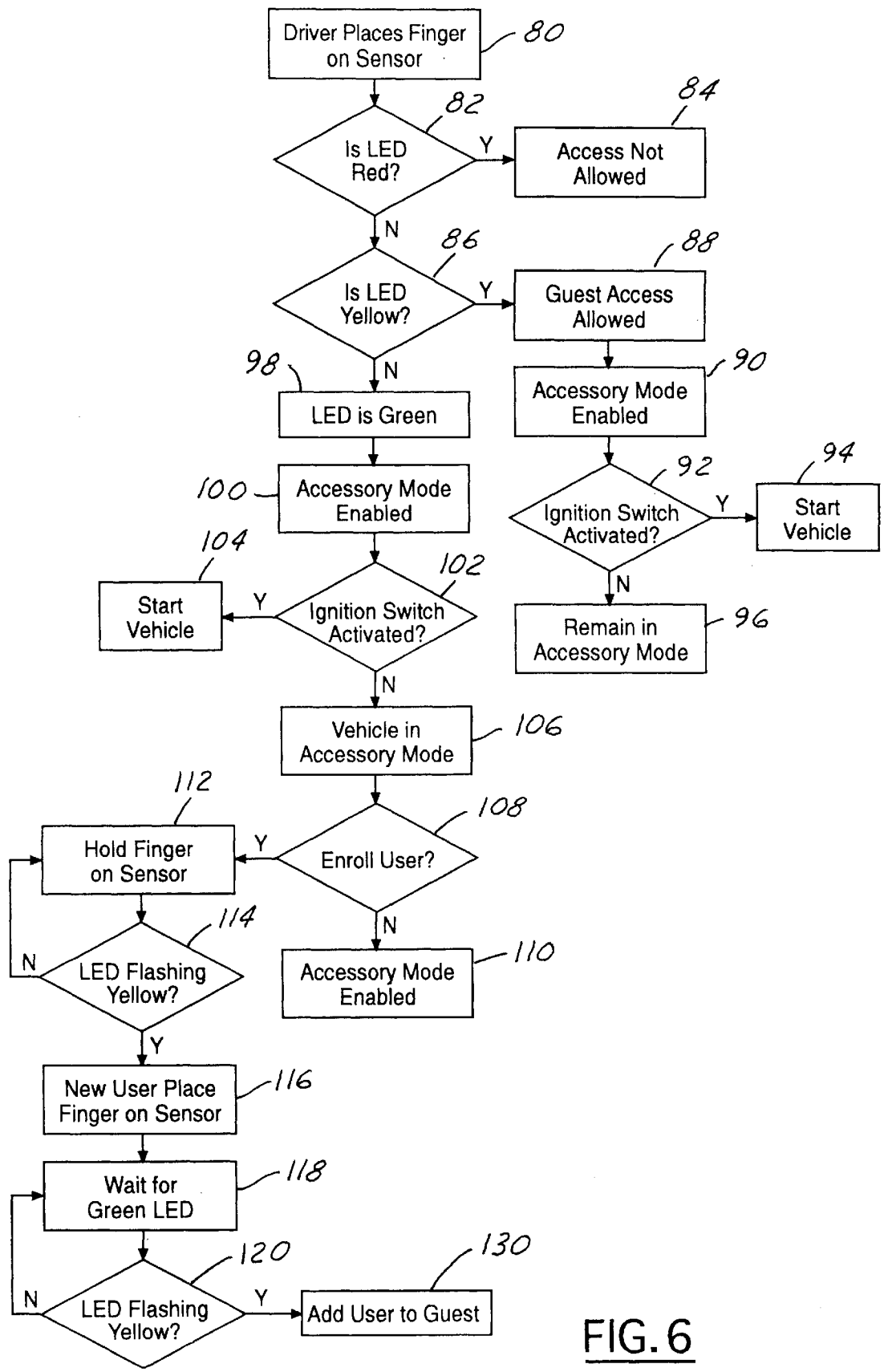
FIG. 6 is a flow chart of the operation of the starting system according to the present invention.

Referring now to FIG. 6, one example of an operation of the starting system according to the present invention is illustrated. When the driver enters the vehicle and an accessory system or the ignition system is desired to be operated, the driver places the finger on the sensor in step 80. A comparison is then made with the authorized user or users stored in the memory of the system. If the fingerprint signal is not substantially equal to or not identical to an authorized user a red LED indicator is illuminated in step 82 and access is not allowed in step 84. The controller system determines whether the user is a "super user" or a guest user. A "super user" is an authorized user that can authorize entry of guest users into the memory. A guest user may also have been programmed into the authorized user list. If the user is a guest user a different color indicator may be presented to the vehicle operator. For example, a yellow indicator in step 86 may be used. If the indicator is yellow, guest access may be allowed to operate the vehicle 88 and accessories. An accessory mode may be enabled in step 90 by placing the finger on the sensor for a relatively short period of time. Accessory mode may also be enabled by pressing switch in a particular manner such as once for a short period of time. Another way in which an accessory may be enabled is after placing the finger on the sensor and the system recognizes the signal as a guest user, speaking a voice command "accessory mode" or the like may be used. The accessory mode may be used in a voice switch situation mentioned above in FIG. 1.

In step 92, the ignition switch may be activated in a variety of manners. For example, holding down the mechanical switch illustrated in FIGS. 3–5, or placing the finger on the sensor for a longer time period than that of accessory mode enabled in step 90. Another manner in which the ignition switch may be activated is by speaking a voice command to actuate a voice-activated switch such as that described above in FIG. 1.

If the fingerprint signal matches an authorized fingerprint and the ignition switch is activated in a proscribed manner, the vehicle is started in step 94. If the ignition switch is not activated, the system remains in accessory mode in step 96.

Referring back to step 86, if the indicator is not in a yellow mode the LED is green in step 98. After step 98 step 100 is activated in which an accessory mode is enabled. If the ignition switch is activated in step 102 the vehicle is started in step 104. If the ignition switch is not activated in step 102 the vehicle remains in an accessory mode in step 106. Steps 102, 104 and 106 are nearly identical to that of steps 92, 94, and 96 except that the authorized user is a "super user." The difference between a super user and a guest user is that a super user may choose to enroll a guest user in step 108. To enroll a guest user a voice command or activating a switch in a particular time sequence may be required. If a user is not desired to be enrolled, step 110 keeps the vehicle in an accessory mode. If a user is desired to be enrolled in step 108, the super user's finger is placed upon the sensor for a predetermined amount of time in step 112. This may activate a programming mode such as a flashing yellow indicator in step 114. The finger must remain on the sensor until the indicator flashes. Once the indicator is flashing, step 116 is activated. In step 116 a new user's finger is placed upon the fingerprint pad and read to provide a new user signal to controller. The new user is to remain upon the sensor until an LED changes to indicate a successful or complete read such as to a green LED in step 118. In step 120 if a green LED is not present, step 118 must be executed and the new user's finger must remain upon the sensor until a yellow flashing indicator is generated. Once an indicator changes to flashing yellow, a guest user is then added to the system. The guest user has an authorization status less than that of a "super user" and therefore the guest user cannot program other authorized persons but can operate the vehicle in both accessory mode and in a driving mode in which the ignition system may be operated.

To turn off the engine, the same sequence may be performed with steps 104 or 94 replaced with a stopped vehicle command. Also, an engine off command may be provided without fingerprint recognition. Therefore, once the vehicle is started a voice command or a switch may be depressed to turn the vehicle off.

The above method has been described with respect to three LEDs which may form indicator 32 described above. Although three LEDs are illustrated, those skilled in the art will recognize various numbers of LEDs, audible chimes, tones or voice commands may also be used to signal the status of the user as well as provide an indication as to programming a guest user such as that described in steps 112–130.

The above method may also be modified to start the engine from an accessory mode. The same sequence may be followed to start the vehicle from an accessory mode. That is, the driver may place his finger on the sensor and wait for authorization and then depress the switch and generate a voice command to activate a voice-activated switch to enable the engine to start.

While particular embodiments of the invention have been shown and described, numerous variations and alternate embodiments will occur to those skilled in the art. Accordingly, it is intended that the invention be limited only in terms of the appended claims.

What is claimed is:

1. A switch assembly for an automotive vehicle comprising:
   a pivoting member having a first position and a second position;
   a spring urging said pivoting member into said first position;
   a fingerprint sensor disposed on said pivoting member;
   a first housing disposed adjacent to said pivoting member; and
   a switch disposed on said housing so that when said pivoting member is in said second position said switch is closed.

2. A switch assembly as recited in claim 1 further comprising an instrument panel, said pivoting member pivotally coupled to said instrument panel.

3. A switch assembly as recited in claim 1 wherein said switch comprises a non-key-activated switch.

4. A starting system for an engine of an automotive vehicle having an ignition system coupled to the engine, said system comprising:
   a switch assembly comprising,
      a pivoting member having a first position and a second position;
      a spring urging said pivoting member into said first position;
      a fingerprint sensor disposed on said pivoting member;
      a first housing disposed adjacent to said pivoting member; and
      a switch disposed on said housing so that when said pivoting member is in said second posit on said switch generates a start signal;
   a memory having n authorized fingerprint signal stored therein; and
   a controller coupled to the ignition system, said fingerprint sensor, said memory and said switch, said controller comparing said fingerprint signal with said authorized fingerprint signal a d enabling said ignition system in response to said start signal and said fingerprint signal being substantially equal to said authorized fingerprint signal.

5. A starting system as recited in claim 4 further comprising an instrument panel, said pivoting member pivoting relative to said instrument panel.

6. A starting system as recited in claim 4 further comprising an indicator coupled to said controller.

7. A starting system as recited in claim 6 wherein said indicator comprises a multicolor light emitting diode assembly.

8. A starting system as recited in claim 7 wherein each color of said multicolor light emitting diode indicates a status level.

9. A method of starting an engine of an automobile comprising:
   generating a first fingerprint signal from a fingerprint sensor disposed on a pivoting member;
   comparing said first fingerprint signal with a second fingerprint signal stored within a memory;
   issuing a fingerprint enable signal in response to said first fingerprint signal being within said memory;
   generating a start signal by pivoting said pivoting member to contact a mechanical switch; and
   starting an engine in response to said start signal and said fingerprint enable signal.

10. A method as recited in claim 9 wherein generating a start signal comprises issuing a start command.

11. A method as recited in claim 9 further comprising the step of generating a stop signal.

12. A method as recited in claim 9 wherein generating a stop signal comprises issuing a stop voice command.

13. A method as recited in claim 9 wherein generating a stop signal comprises activating the mechanical switch.

14. A method as recited in claim 9 further comprising generating a status level via an indicator.

15. A method as recited in claim 9 further comprising enabling a guest mode.

16. A method as recited in claim 9 wherein enabling a guest mode comprises recognizing an authorized user and within a predetermined time reading a guest fingerprint; and storing said fingerprint in said memory.

* * * * *